United States Patent [19]

Lee

[11] 3,783,193

[45] Jan. 1, 1974

[54] APPARATUS FOR ACTIVATING A REMOTELY LOCATED DEVICE IN RESPONSE TO THE RINGING OF A CALLED TELEPHONE SUBSCRIBER STATION

[75] Inventor: Martin Lee, Santa Clara, Calif.

[73] Assignee: Pantek Corporation, San Mateo, Calif.

[22] Filed: Jan. 28, 1971

[21] Appl. No.: 110,520

[52] U.S. Cl. .............................. 179/2 A, 179/41 A

[51] Int. Cl. .............................. H04m 11/00

[58] Field of Search .............................. 179/41 A, 2 A

[56] References Cited

UNITED STATES PATENTS

| | | | |
|---|---|---|---|
| 3,360,777 | 12/1967 | Kolm | 179/2 A |
| 3,414,881 | 12/1968 | Chapman | 340/164 A |
| 3,443,032 | 5/1969 | Mitsui | 179/2 A |
| 3,513,443 | 5/1970 | Andersen | 340/164 R |
| 3,532,822 | 10/1970 | Ohanlon | 179/2 A |
| 2,665,375 | 1/1954 | Collyer | 179/41 A |
| 3,198,888 | 8/1965 | Lemelson | 179/41 A |
| 3,267,379 | 8/1966 | Bloxsom | 179/41 A |
| 3,351,714 | 11/1967 | Kunzelman | 179/41 A |

*Primary Examiner*—Harold I. Pitts

*Attorney*—Jack M. Wiseman

[57] ABSTRACT

Apparatus for the activation of a remotely located device under the control of telephone subscriber lines and stations. The apparatus of the present invention is located in the vicinity of a called telephone subscriber station and is operated to activate a remotely located device through two series of ringing signals initiated by a calling telephone subscriber station and produced by the called telephone subcriber station. The first series of ringing signals activates a timer which resets a counter that controls the operation of the remotely located device providing the counter is not on a preselected code position. The timer disables the counter from receiving counting pulses during the first series of ringing signals. In addition thereto, the timer enables the counter to receive counting pulses during a period $P_2$. Should the second series of ringing signals be produced by the called subscriber station within the period $P_2$ and be a preselected number of ringing signals, the counter will then activate the remotely located device.

8 Claims, 6 Drawing Figures

INVENTOR.
MARTIN LEE

BY Jack M. Wiseman

ATTORNEY

INVENTOR.
MARTIN LEE

BY Jack M. Wiseman
ATTORNEY

SOURCE OF A.C. POWER

INVENTOR.
MARTIN LEE

BY Jack M. Weseman

ATTORNEY

APPARATUS FOR ACTIVATING A REMOTELY LOCATED DEVICE IN RESPONSE TO THE RINGING OF A CALLED TELEPHONE SUBSCRIBER STATION

BACKGROUND OF THE INVENTION

The present invention relates in general to remote control systems and more particularly to apparatus for activating and deactivating a remotely located device in response to the ringing of a called telephone subscriber station.

Heretofore, remote control systems were employed to control the activation of various devices. Certain remote control systems did use telephone subscriber lines to operate the remotely located devices. However, such remote control systems had no provision for preventing the activation of the remotely located devices when unintended or false conditions were present.

Furthermore, such remote control systems employed complicated and cumbersome equipment and components. Such equipment and components had tended to decrease the reliability of the remote control system. Additionally, many of these remote control systems had depended upon one or more characteristics of the system for establishing connections with the remotely located devices. In so doing, the usefulness and practicality of the remote control systems were limted in using telephone subscriber lines and stations.

United States Pats. of interest in this art are as follows. Waldman, No. 3,049,592; Bloxsom, No. 3,267,-379; Robbins, No. 2,363,145; McNutt, No. 2,616,-972; Chaloupka, No. 3,347,987; New et al., No. 3,383,467; Jahns et al., No. 3,400,219; Hoffman, No. 3,428,750; Lovell, No. 3,484,553; Walker, No. 3,485,-952; Stenhammar, No. 3,324,245; Waldman et al., No. 3,308,239.

SUMMARY OF THE INVENTION

Apparatus for the activation of a remotely located device under the control of telephone subscriber lines and stations. The apparatus of the present invention is located in the vicinity of a called telephone subscriber station and is operated to activate a remotely located device through a plurality of series of ringing signals initiated by a calling telephone subscriber station and produced by the called telephone subscriber station. One series of ringing signals activates a timer, which enables the counter to receive counting pulses during a preselected time period. Another series of ringing signals during this preselected time period causes counting pulses to operate the counter for controlling the operation of the remotely located device.

This arrangement serves to obviate the activation of the remotely located device by false or unintended signals.

DESCRIPTION OF THE PREFERRED EMBODIMENT

Figures 1, 2, 4:
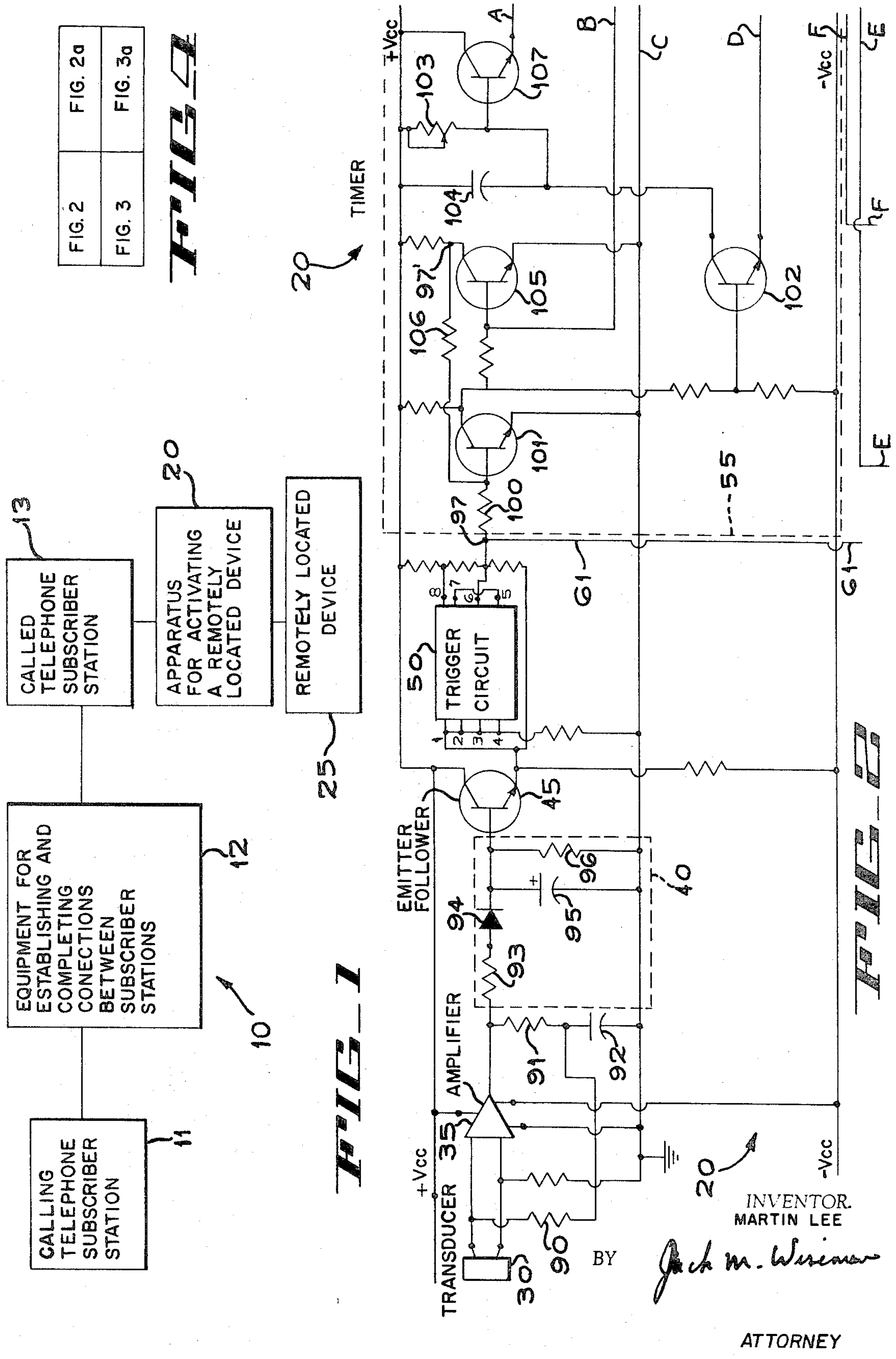
FIG. 1 is a block diagram of a remote control system embodying the present invention and employing telephone subscriber lines and stations.
FIGS. 2, 2A, 3 and 3A when arranged in the manner shown in FIG. 4 are a schematic diagram of the apparatus of the present invention for activating a remotely located device.
Figure 2A:
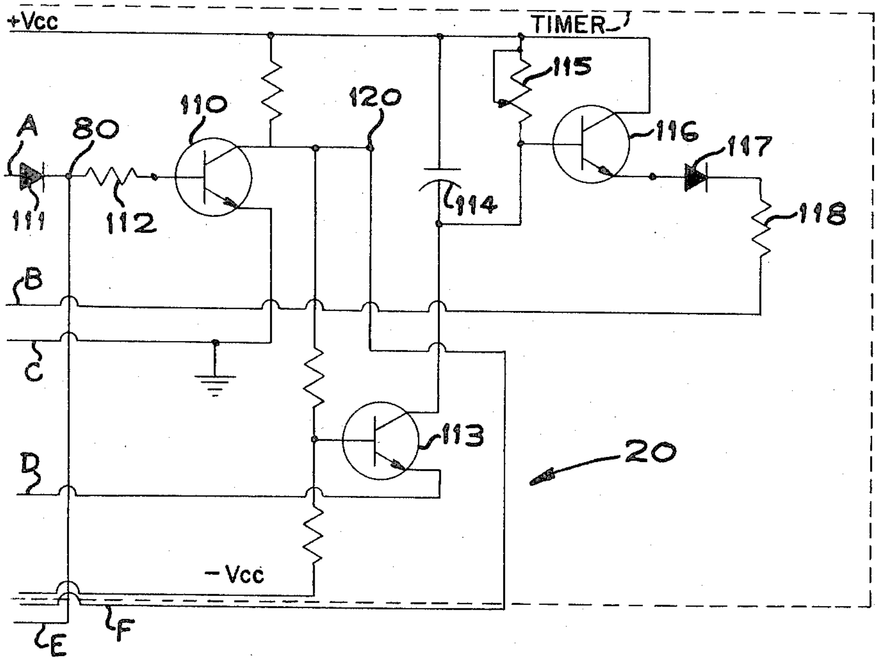
Figure 3A:
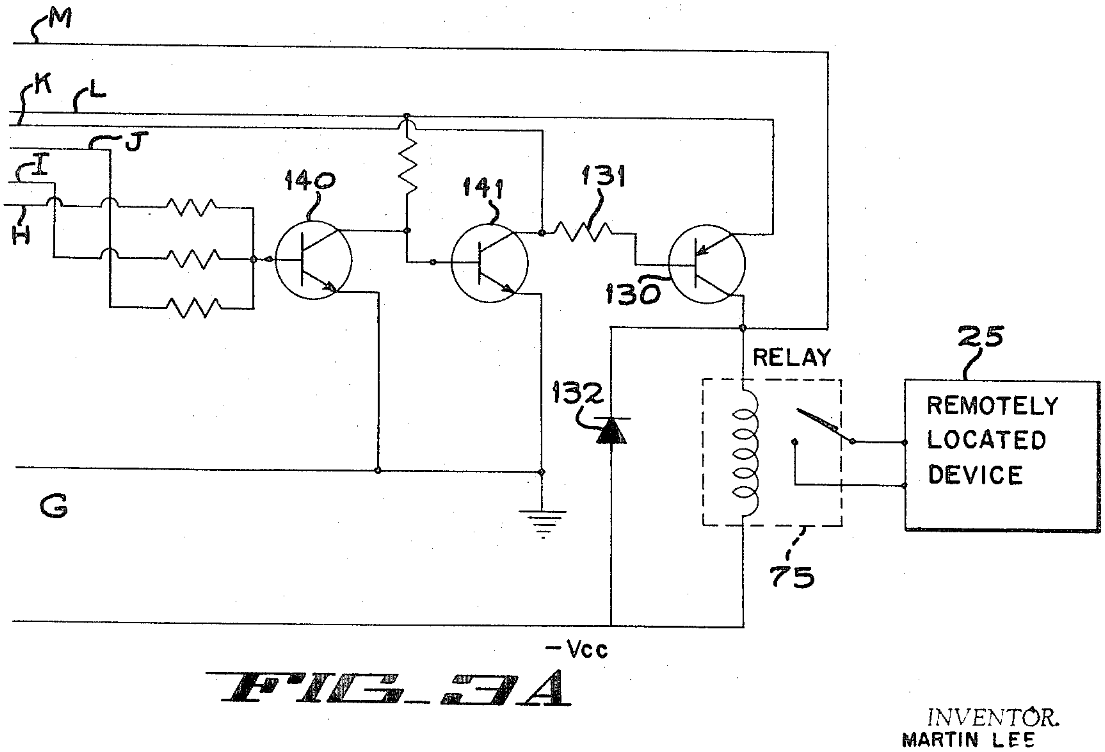
Figure 3:
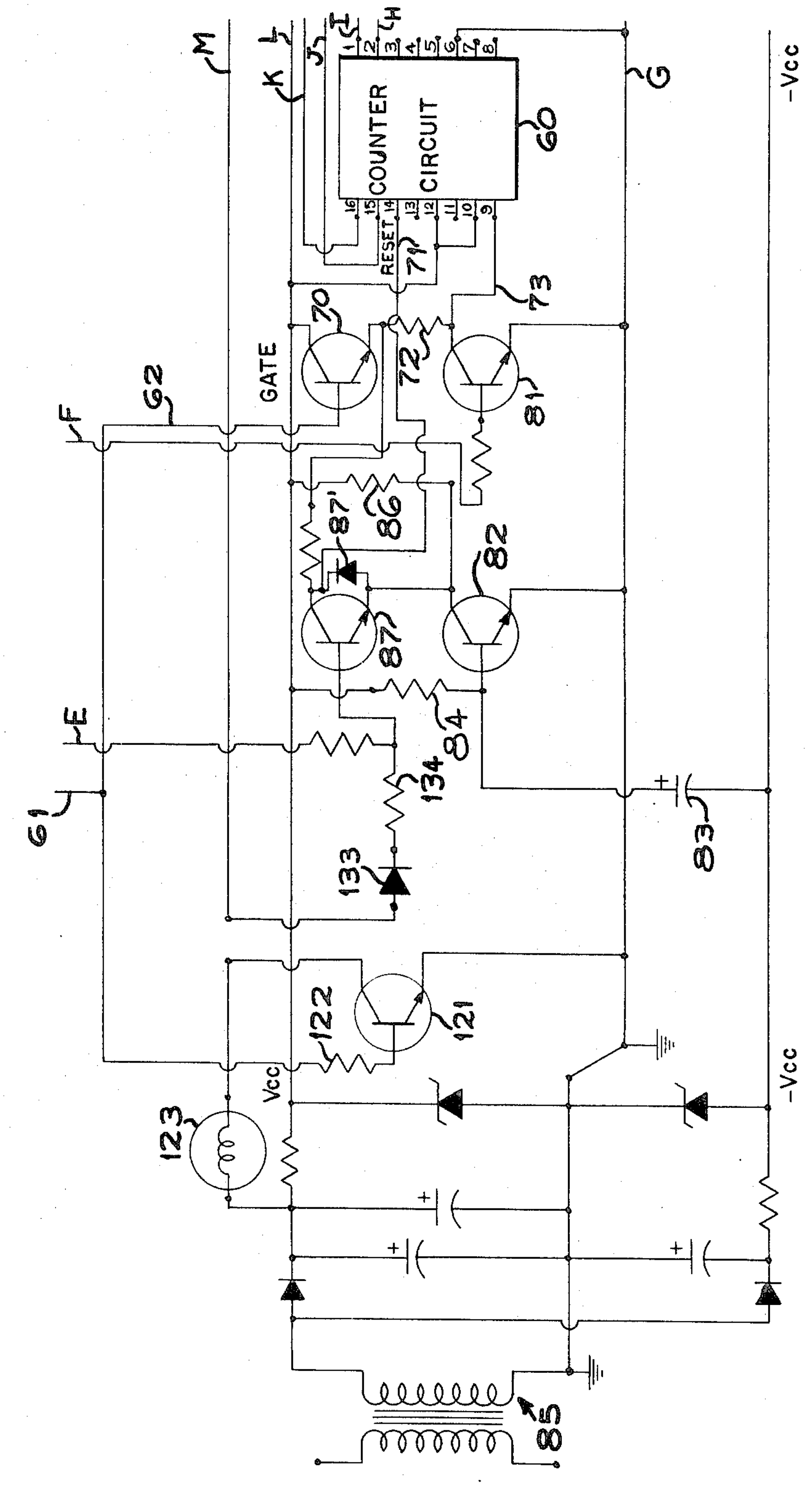

Illustrated in FIG. 1 is a remote control system 10 embodying the present invention, which employs conventional telephone subcriber lines and stations. By way of example, a conventional telephone subscriber station 11 has an operator dial the telephone instrument thereof to initiate a call at the calling telephone subscriber station through conventional telephone equipment for establishing and completing connections between the calling telephone subscriber station 11 and a called telephone subscriber station 13. In so doing, the operator through the telephone instrument at the calling subscriber station 11 dials successively the predetermined number of a conventional called telephone subscriber station 13, which results in the producing of two series of ringing signals in the form of pulses or ringing tones at the called telephone subscriber station 13, while the handset of the instrument at the telephone subscriber station 13 remains in the cradle thereof. During the entire operation hereof, the handset of the instrument at the called telephone subscriber station remains in the cradle in engagement with the plunger thereof. Located in the vicinity of the called telephone subscriber station 13 is the apparatus 20 of the present invention. Should the second series of ringing signals produced by the called telephone subscriber substation 13 be of a predetermined number and be produced within a preselected time period $P_2$, then the apparatus 20 of the present invention will activate a suitable remotely located device 25, such as a sprinkler system, electric lights, electrically operated furnace, electric coffee maker or the like. On the other hand, should the number of ringing signals produced by the called telephone subscriber station 13 during the second series of ringing signals not be of the preselected code or not be produced during the preselected time period $P_2$, then the apparatus 20 would not activate the remotely located device 25.

As shown in FIGS. 2, 2A, 3 and 3A, the apparatus 20 of the present invention comprises a suitable transducer or a sound pick-up device 30, such as a crystal microphone or inductive pick-up coil to pick up the ringing signal produced by the called subscriber station 13. A device with an attenuator could be wired directly to the subscriber station 13 to sense ringing pulses in lieu of detecting ringing tones. Connected to the output of the transducer 30 is a suitable amplifier 35. The output signal from the amplifier 35 is fed to a suitable half-wave rectifier 40 for rectification.

The direct current signals are fed to a conventional emitter follower circuit 45 and the emitter follower circuit 45 drives a suitable trigger circuit 50, such as the well known Schmidt trigger circuit.

The operation of the trigger circuit 50 during the first series of ringing signals produces pulses to initiate the operation of a timer circuit 55 and resets a conventional counter circuit 60 over a conductor 61, conductor 62, an emitter circuit 70, and reset conductor 71 should the counter circuit 60 not be on a preselected code. The timer circuit 55 is now activated and will inhibit the counter circuit 60 from receiving counting pulses during the time period that the first series of ringing signals is produced by the called telephone subscriber station 13. Actually, the timer circuit inhibits the counter circuit 60 from receiving counting pulses at all times, excepting the period $P_2$. More specifically, the trigger circuit 50 activates the timer 55 at a time $T_o$ which is the beginning of the period $P_1$ and which is also the initiation of the first series of pulses. The timer circuit 55 will remain so activated until the time $T_1$, which is the expiration time for the period $P_1$. The time $T_1$ occurs at a preselected time interval after the time $T_o$. The period $P_1$ is the time interval between $T_o$ and $T_1$. Commencing at the time $T_1$, the timer circuit 55 enables counting pulses to be transmitted to the counter 60 over the conductor 73 and through a resistor 72. At the end of a time period $P_2$, the timer circuit 55 inhibits the conduction of counting pulses over the conductor 73 and the timer circuit 55 is now reset for further activation under the control of the trigger circuit 55 for beginning a new cycle of operation. The period $P_2$ is a fixed time interval commencing at the time $T_2$ and ending at a time $T_3$. The operator at the subscriber calling station 11 also initiates a second call to the called subscriber station 13 within the period $P_2$. The second call, of course, causes the called telephone subscriber station 13 to generate ringing signals, such as a series ringing pulses or a series of ring tones, which are again picked up by the transducer 30. Should the second series of ringing signals be produced within the time period $P_2$ and be of a preselected number of ringing tones, then the counter 60 will operate the remotely located device 25. For deactivating the remotely located device 25, the operator repeats the above procedure to move the counter 60 from the coded condition that heretofore had operated the remotely controlled device 25.

In a manner previously described, the second series of ringing signals during the time period $P_2$ is amplified by the amplifier 35; rectified by the rectifier circuit 40; advance through the emitter follower 45 and produce trigger pulses in the output of the trigger circuit 50. The trigger pulses are transmitted from the trigger circuit 50 over the conductor 61, the conductor 62, through the emitter follower circuit 70, through the resistor 72 over the conductor 73 to the counter circuit 60. Should the operator permit the second series of ringing signals to be produced during the period $P_2$ and to continue for a preselected time duration or a preselected number of ringing signals by counting the ring-back tones, the counter circuit 60 will cause a relay 75 to be energized. This action closes the contacts of the relay 75 to activate the remotely located device 25. It is apparent that false operation of the remotely located device 25 is obviated, since the counter circuit 60 requires a preselected number of pulses controlled by the operator at the calling telephone subscriber station 11 counting the series of ring back tones produced at the calling telephone subscriber station 11 which must be produced during a predetermined time interval. During the entire operation, the handset of the telephone instrument at the called subscriber station 13 remains on the cradle in engagement with the plunger or plungers thereof.

The following description relates to protecting against false operations due to power failure and resets the apparatus 20 when initially turned on.

When the apparatus 20 is initially turned on, there is no signal picked-up by the transducer 30 and, hence, there is no output triggering signal produced by the trigger circuit 50. Thus, the timer circuit 55 is not activated and a low voltage appears at an output junction 80 thereof. The conductor 73 over which counting pulses are transmitted is now grounded through a transistor 81. Bias is removed from a transistor 82 until a capacitor 83 is charged. When current flows through a resistor 84 by virtue of a conventional power supply 85 being turned on, the capacitor 83 charges.

While the capacitor 83 is charging, the collector electrode and the transistor 82 does not have current flowing therein aand allows current flow through a resistor 86 to forward bias a transistor 87. From a design point of view, operating conditions can be improved by connecting a diode 87' across the transistor 87. The forward biasing of the transistor 87 resets the counter circuit over the conductor 71. The transistor 87 also allows a reset signal to be conducted over the conductor 71 to the reset input terminal of the counter circuit 60 whenever the potential of the junction 80 of the time circuit 55 is low and relay 75 is not energized.

When an operator desires to change the state of the remote control apparatus 25 or to activate the same, he dials the number of the called subscriber station 13 at a time $T_o$ and the series of ringing tones is produced at the called station 13. Subsequently, the operator dials the number of the called subscriber station 13 during the time period $P_2$ and the second series of ringing tones is produced at the called station 13 for a preselected period of time to apply a prescribed number of counting pulses to the counter circuit 60, which is attained by counting the ring-back tones at the calling station 11.

The transducer 30 is located in the vicinity of the called subscriber station 13 to pick-up the ringing tone signals produced therefrom. The transducer 30 has its output signal applied to the input side of the amplifier 35. Direct current stability of the amplifier 35 is maintained through a resistor 90, a resistor 91 and a capacitor 92. The output alternating current of the amplifier 35 is not fed back to the inverting input thereof through the resistors 90 and 91, since the capacitor 92 connects the resistor 91 to ground. However, the alternating current output signal from the amplifier 35 is transmitted to the half-wave receiver 40 through a resistor 93 and is rectified by a diode 94 to charge a capacitor 95. The capacitor 95 will discharge through a resistor 96 in the absence of a signal from the amplifier 35.

The emitter follower 45 is connected to the resistor 96. When the voltage across the capacitor 95 reaches a prescribed magnitude, the trigger circuit 50 will produce a trigger pulse in the output thereof to cause a junction 97 to be at a high potential. This occurs when the first series of ringing tones produced by the called station 13 charges the capacitor 95 to the firing potential of the trigger circuit 50 so that the junction 97 will be at the high potential, when the output signal from the amplifier 35 is discontinued and the capacitor 95 discharges through the resistor 96. When the capacitor 95 discharges so that the potential thereon is below the firing point of the trigger circuit 50, the junction 97 is at a low potential.

When the junction 97 is at a high potential, a timer input resistor 100 has a current flow therethrough which causes current to flow through the base of a transistor 101. This action results in the collector of the transistor 101 being at a low potential. As a consequence thereof, the bias on a transistor 102 is removed. The removal of the bias on the transistor 102 allows a resistor 103 to discharge a capacitor 104. When the collector of the transistor 101 is at a low potential, the bias on a transistor 105 is removed and the potential on the collector of the transistor 105 goes high, whereby current flows through a resistor 106 to the base of the transistor 101 to maintain the transistor 101 in a saturated state after the potential at the junction 97 goes low.

The discharge of the capacitor 104 through the resistor 103 results in the potential applied to the base electrode of a transistor 107 to be high. The resistor 103 and the capacitor 104 form an R-C timing network for selecting the fixed time period $P_1$.

When the potential applied to the base electrode of the transistor 107 is high, a bias is applied to the base electrode of a transistor 110 through a diode 111 and a resistor 112. At this time the potential at the junction 80 is high. This action causes the potential on the collector electrode of the transistor 110 to go low and to remove the bias from the base electrode of a transistor 113. At this time, the potential at a junction 120 is low. Thereupon, a capacitor 114 discharges through a resistor 115. The resistor 115 and the capacitor 114 form an R-C timing network for selecting the fixed time period $P_2$.

When the base electrode of a transistor 116 reaches a sufficiently high potential through the discharge of the capacitor 114 through the resistor 115, the transistor 116 conducts. Thereupon, current flows through a diode 117 and a resistor 118 to the base electrode of the transistor 105. As a result thereof, the transistor 103 and the transistor 101 are returned to their initial state at the expiration of the fixed time period $P_2$.

To recapitulate the timing operations and the potential conditions at junction 97', 80 and 120 for the timing circuit 55, it is to be observed that at the time $T_0$ the junctions 97' and 120 are at a high potential and the junction 80 is at a low potential. At the time $T_1$, the junction 120 is at a low potential and the junctions 80 and 97' are at a high potential. At the expiration of the time period $P_2$ or at the time $T_2$, the junctions 97' and 80 are at a low potential and the junction 120 is at a high potential. At the completion of the first series of ringing pulses or tones, the junctions 80 and 97' are at a high potential and remains in this condition until the transistors 101 return to their initial state.

The junction 97 is connected to a transistor 121 through a resistor 122. When the potential at the junction 97 is high, which occurs at time $T_0$, the transistor 121 conducts and current flows through the collector electrode thereof. As a consequence thereof, a lamp 123 is energized. The lamp 123 serves to show that the apparatus 20 will properly receive the incoming ringing signals with sufficient magnitude to initiate and complete a cycle of operation. One side of the lamp 123 is connected to the collector electrode of the transistor 121 and the other side of the lamp 123 is connected to the power supply 85. The junction 97 is also connected to the base electrode of the emitter follower transistor 70 over the conductor 62. Simultaneously, the transistor 70 functions as an emitter follower causing the counter circuit 60 to reset in a manner previously described. Any counting pulses present will be shorted to ground through the transistor 81 in a manner previously described, since the potential at the junction 120 is high.

At the completion of the period $P_1$, the junctions 97' and 80 are at a high potential and the junction 120 is at a low potential. When the potential at the junction 120 is low, the bias is removed from the gate circuit transistor 81 which enables trigger pulses to be transmitted from the trigger circuit 50 through the junction 97, through the emitter follower transistor 70, through the resistor 71, over the conductor 73 to be applied to the counter circuit 60.

Should the called station 13 produce a second series of ringing tones or pulses during the time period $P_2$, the counter circuit 60 is operated in the manner just described. Should the number of ringing tones or pulses be the preselected code, the counter circuit 60 applies a potential to the base electrode of a transistor 130 through a resistor 131 to cause the transistor 130 to conduct. Thereupon, a diode 133 conducts through a resistor 134 to apply a potential to the base electrode of the transistor 87. The transistor 87 now inhibits any new calls during the period $P_1$ from resetting the counter 60. As a consequence thereof, the relay 75 is energized to activate the remotely located device 25. A diode 132 serves to protect the transistor 130 from excessive voltage when the relay 75 is deenergized.

During the time period $P_2$, the transistors 82 and 87 conduct to short out the reset terminal for the counter 60 over the conductor 71. The transistor 82 always operates in a saturated state when the apparatus 20 is turned on. Initially, the bias is removed from the transistor 82 until the capacitor 83 is charged by the conduction of current through the resistor 84 in a manner previously described. During the time the capacitor 83 is charging, the collector electrode of the transistor 82 does not have any current flow therethrough and the current flow through the resistor 86 forward biases the transistor 87 to reset the counter circuit 60. The transistor 87 enables signals to advance to the reset terminal of the counter circuit 60 whenever the junction 80 is at a low potential and the collector electrode of the transistor 130 is at a low potential. This would occur prior to the time $T_1$, or when the relay 75 is not energized.

At the expiration of time period $P_2$, the junction 120 is at a high potential in a manner previously described and the transistor 81 conducts to ground the counting input of the counter circuit 60 in a manner previously described for inhibiting counting pulses to be transmitted over the conductor 73 to the input counting terminal of the counter circuit 60.

When the counter terminal 9 of the counter circuit 60 has had a suitable number of pulses to cause the transistor 130 to conduct, the relay 75 is energized in a manner previously described. Should either the counter terminals 1, 2, or 15 of the counter circuit 60 have a suitable potential thereon, a transistor 140 does not conduct, which in turn causes a transistor 141 to conduct. Thereupon, the transistor 130 conducts in the manner previously described for energizing the relay 75. The relay 75 remains energized since the counter circuit 60 remains in its coded state.

To deenergize the relay 75, the above sequence of operations is repeated. This serves to advance the counter circuit 60 to remove the same from its coded state to deenergize the relay 75.

I claim:

1. Apparatus for use in a remote control system employing telephone subscriber lines and equipment and having a calling telephone subscriber station to initiate ringing signals to be detected at a called telephone subscriber station, said apparatus comprising:

a. means for activating a remotely located device;

b. a counter operative for controlling the operation of said means;

c. circuit means located in the vicinity of said called telephone subscriber station to detect ringing signals at said called telephone subscriber station and producing therefrom pulses, said circuit means being connected to said counter for applying pulses to said counter for operating said counter; and d. a timer circuit activated by said circuit means and operative for controlling the predetermined time interval in which said circuit means applies pulses to said counter;

e. said circuit means transmitting a series of pulses to said counter in response to detecting ringing signals at said called subscriber telephone station during said predetermined time interval, the number of pulses transmitted by said circuit means being commensurate with the number of ringing signals detected by said circuit means, said counter operates said means in response to said circuit means applying a predetermined number of pulses to said counter during said predetermined time interval, f. said circuit means detecting a first series of ringing signals and a second series of a predetermined number of ringing signals, said circuit means in response to said first series of ringing signals activates said timer circuit, whereby said timer circuit enables said counter to receive the second series of ringing signals after the completion of the first series of ringing signals to operate said means in response to said circuit means transmitting to said counter during said predetermined time interval a second series of a predetermined number of pulses.

2. Apparatus as claimed in claim 1 wherein said predetermined time interval commences at a fixed time interval after the initiation of said first series of ringing pulses and terminates at the expiration of a preselected time interval thereafter.

3. Apparatus as claimed in claim 2 wherein said timer circuit resets said counter during said first series of ringing signals when said counter is not operating said means.

4. Apparatus as claimed in claim 3 wherein said timer circuit inhibits said circuit means from operating said counter to operate said means at a time other than during said predetermined time interval.

5. Apparatus as claimed in claim 4 and including protecting means responsive to said circuit means and said timer circuit and connected to said counter for reseting said counter after power failure.

6. Apparatus as claimed in claim 5 wherein said protecting means resets said counter when said apparatus is turned on.

7. Apparatus as claimed in claim 1 and comprising indicator means connected to said timer circuit and operative in response to said circuit means detecting signals of preselected magnitude produced at said called subscriber station.

8. Apparatus as claimed in claim 1 wherein said subscriber station produces a third series of ringing signals and a fourth series of ringing signals, said circuit means in response to said third series of ringing signals activates said timer circuit, whereby said timer circuit enables said counter to change its state to operate said means for deactivating said remotely located device in response to said circuit means transmitting to said counter during a predetermined time interval a fourth series of pulses.

* * * * *